United States Patent Office 3,453,165
Patented July 1, 1969

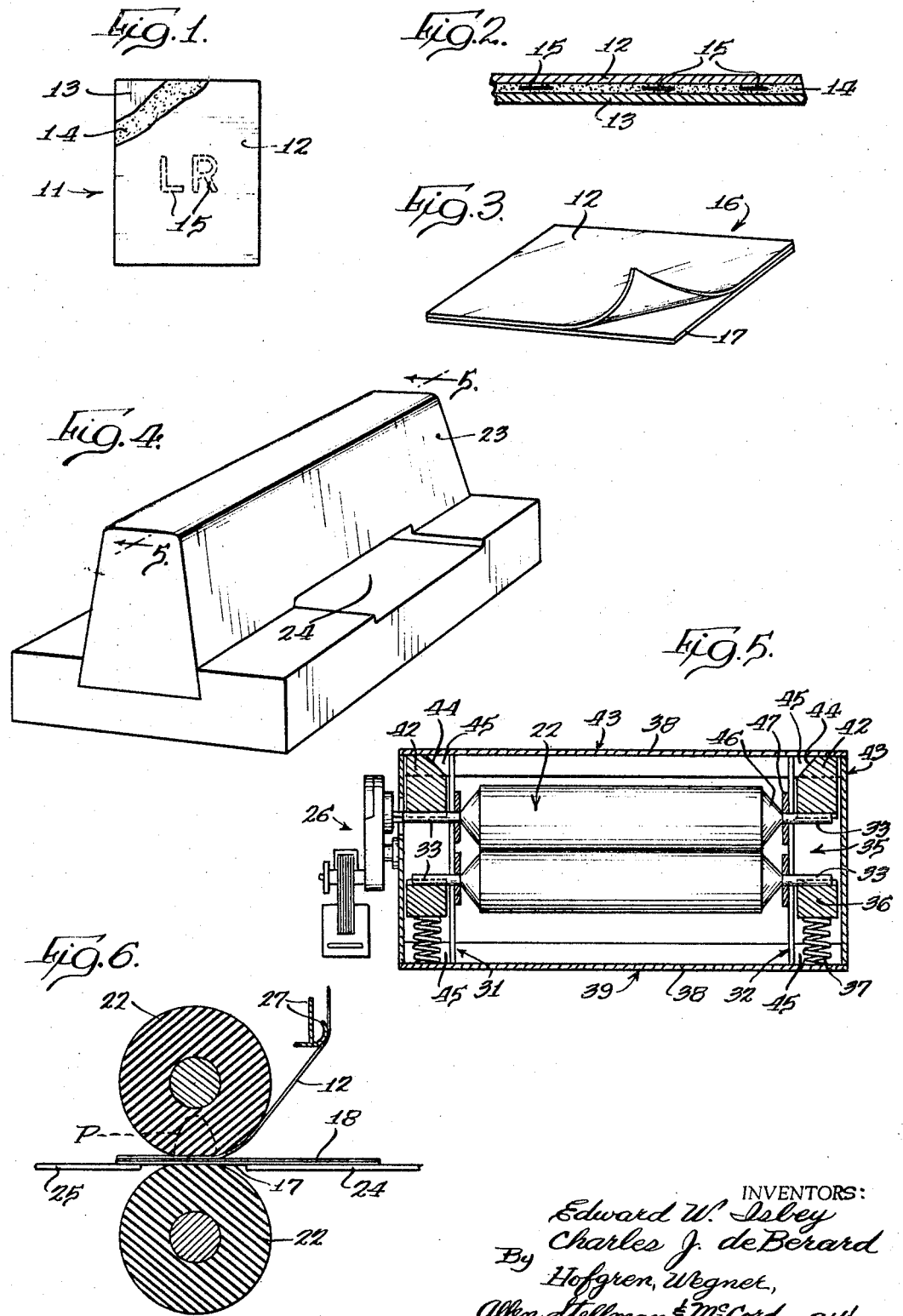

3,453,165
METHOD OF MAKING COLD FORMED TRANSPARENT LAMINATES
Edward W. Isbey, Chicago Heights, and Charles J. De Berard, Flossmoor, Ill., assignors to Best Plastic Products, Inc., a corporation of Illinois
Division and continuation-in-part of application Ser. No. 280,062, May 13, 1963, now Patent No. 3,132,581, dated May 12, 1964. This application Apr. 6, 1964, Ser. No. 357,468
Int. Cl. B32b 31/20
U.S. Cl. 156—235          6 Claims

ABSTRACT OF THE DISCLOSURE

A method of making a transparent laminate which includes, providing a coating of transparent cold bonding tacky pressure-sensitive adhesive upon the surface of a pair of transparent sheets, applying an ink image upon the surface of one of the pressure-sensitive adhesive coatings and laminating the sheets together under sufficient pressure to embed the image and eliminate entrapped air and fogginess in the laminate.

---

This application is filed as a divisional application and a continuation-in-part application of copending application Ser. No. 280,062, entitled "Cold Process Lamination Machine and Method," filed May 13, 1963, now U.S. Patent No. 3,132,581. Said copending application Ser. No. 280,062 is a continuation-in-part of application Ser. No. 127,270, filed July 27, 1961, now abandoned.

This invention relates to cold process lamination. More particularly, this invention relates to a process for making plastic laminate structures having printed indicia sandwiched between plastic layers wherein such laminate structures are useful as projection transparencies in which the indicia is an image and the plastic layers are of translucent or transparent plastic material.

Projection systems have long been in use for projecting images from transparencies to a viewing screen. Such systems normally use a beam of light directed through the transparency and focused on the screen. Formerly, in providing transparencies for use in such systems, it has been necessary to use a hot process lamination or to suffer the inadequacies of air pockets trapped within the laminate structure. Also, it has been found that many image-forming substances and especially the colored inks are heat-sensitive and are either destroyed or color converted at the hot processing temperatures.

In our copending application, Ser. No. 280,062, identified above, we have proposed a cold process lamination method which is adapted in accordance with the present invention for producing such laminate structures as transparencies.

It is a general object of this invention to provide a new and useful cold process method of making laminated structures.

Another object is to provide a new and useful method in accordance with the foregoing object wherein heat-sensitive colored inks may be laminated between plastic layers.

Still another object is to provide a method of forming new and useful laminates which may be used as transparencies and which include ink deposits in the form of indicia contained between two transparent sheets in a new and useful manner.

Yet another object is to provide a new and useful method in which fogginess, wrinkling, tearing, or the like, are eliminated in the production of such a laminated structure.

Other objects of this invention will be apparent from the following description and from the drawings, in which:

FIGURE 1 is a face view of a transparency lamination produced in accordance with the invention;

FIGURE 2 is a section through the transparency taken generally along line 2—2 of FIGURE 1;

FIGURE 3 is a perspective view, diagrammatic in nature, illustrating plastic sheeting material useful in forming structures of this invention;

FIGURE 4 is a diagrammatic perspective view of a machine useful in the method of this invention;

FIGURE 5 is a sectional view substantially along line 5—5 of FIGURE 4; and

FIGURE 6 is an enlarged, partially diagrammatic, cross-sectional view through rollers in the machine of FIGURES 4 and 5.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

Referring first to FIGURES 1 and 2, there is illustrated an exemplary form of laminated structure of the present invention which may be produced by the method described herein. The laminated structure is shown generally by reference numeral 11 and includes a pair of facially opposing plastic sheets 12 and 13 with an adhesive layer 14 bonding the sheet faces to each other. A layer 15 of ink, in the form of legible indicia, is provided within the adhesive layer 14 between the plastic sheets 12 and 13. At least one of plastic sheets 12 and 13 is transparent to render the ink legible from the corresponding face of the laminate structure, and preferably both sheets 12 and 13 are transparent to provide a true transparency for use in transparency projection systems.

The illustrated transparency is produced, generally, by lifting ink from a printed surface by means of application of an adhesive-coated plastic sheet to the surface, withdrawing the adhesive-coated plastic sheet to transfer the ink from the printed surface onto the adhesive layer and thereafter cold pressure laminating the adhesive-coated surface to an adhesive-coated surface of a second plastic sheet. The plastic sheets 12 and 13 may be obtained as a pressure-sensitive laminate structure including the plastic sheet with a pressure-sensitive adhesive on one surface thereof covered with a releasable backing sheet.

A typical example of a pressure sensitive laminate is shown in FIG. 3, as comprising a microfilm sheet 12 of plastic such as acetate, vinyl or Mylar (a condensation polymer of ethylene glycol and terephthalic acid known as polyethylene terephthalate) having a pressure sensitive adhesive 14 disposed uniformly upon its contact face which engages a backing sheet 17 that may consist of a layer of waxed kraft paper to protect the plastic sheet 12, for ease in shipping, handling and application and to facilitate separation of the plastic sheet 12 from the backing sheet 17, preparatory to laminating. One of the corners of the plastic sheet 12 is shown separated from the waxed face of the backing sheet 17.

Briefly, the method of the present invention is a two-step method including a first phase during which the ink is transferred to one adhesive-coated plastic sheet, e.g., 12, and a second phase during which the two plastic sheets 12 and 13 are laminated together providing the ink deposit therebetween, preferably separated from each plastic sheet by a portion of the adhesive material. Both phases can be carried out using the procedures for cold process lamination described herein with the cold process lamination machine described in our copending application, Ser. No. 280,062. Accordingly, an adhesive-coated transparent plastic sheet is cold laminated to a fibrous release sheet usually paper, bearing the printed indicia to be transferred.

The adhesive coating on the transparent plastic sheet is preferably a pressure-sensitive adhesive such as a polyvinyl chloride base pressure-sensitive adhesive. In its more advantageous form, the adhesive should be sufficiently ductile to penetrate into valleys and pores in the porous release sheet surface, i.e., the modulus of elasticity of the adhesive is sufficient to permit flowing of the adhesive into such valleys and pores. Wet processes and rubber cements may also be useful but are not preferred. The adhesive, plastic sheet and release sheet should be selected so that the adhesive has a greater affinity for the plastic sheet and ink than it has for the release surface of the release sheet under release conditions.

The release sheet may advantageously be a fibrous backing sheet, preferably paper, which is coated or impregnated with a water or other solvent soluble release coating. A particularly advantageous form of printed release sheet is a printed clay-coated paper. The ink printed upon the release surface is preferably of the film forming type, including the lacquer base inks as well as other organic inks such as may conventionally be used in rotogravure or flexographic processes. Preferably, the dried ink film is pliable or resilient so that it may be bent during processing without cracking or chipping. Other suitable release sheets, especially those with soluble release surfaces, and film forming inks will be apparent to those skilled in the art.

The laminate of plastic sheet and clay-coated paper is formed under conditions preventing fogging in the resulting structure as will be described hereinbelow. The laminate is then immersed in water or other solvent to dissolve the clay coating or other release agent. The paper or fibrous sheet is then stripped from the structure by separation at the dissolved release surface, and the printed material remains in adherence with the pressure-sensitive adhesive layer on the plastic sheet.

A second plastic sheet having an adhesive layer on one surface thereof is applied in adhesive-to-adhesive contact with the first sheet now carrying the ink. The two sheets are subjected to cold pressure lamination under conditions as will be described hereinbelow to again prevent any fogginess, wrinkling, tearing, or the like, in the two plastic sheets. The resulting structure is the transparency as described hereinabove. Both plastic sheets, the adhesive layer and the ink in the laminate are each preferably sufficiently flexible to provide a flexible laminate structure.

As indicated above, the apparatus or machine described and claimed in our copending application, Ser. No. 280,-062, is useful in the cold process in accordance herewith. The details of construction of such apparatus or machine are set out in said copending application and will not be repeated herein except as a help in understanding the present invention. In general, such apparatus includes a pair of rollers 21 which are spring-urged toward each other, and the lamination is accomplished by driving the layers to be laminated between the rollers at ambient conditions, i.e., in the absence of added heat. The rollers engage to provide a pair of opposing pressing surfaces for affecting the lamination.

A lamination is normally performed in the following fashion using the machine 21 when a plastic facing sheet is to be applied to a sheet of paper stock for transfer of ink. The laminate comprising the plastic sheet 12 and the backing sheet 17 is nipped into the rolls 22 with the backing sheet 17 down. The plastic sheet 12 is peeled free of the backing sheet from its free trailing end towards its nipped end, with the plastic sheet being swung up over the machine cover 23. The paper stock or clay-coated paper sheet 18 is then inserted in proper registry between these sheets at the opened nip and the lamination is carried out progressively while the trailing portion of the plastic sheet 12 is held above the paper stock 18 as the material feeds into the rollers 22. For this purpose the machine cover 23 is fitted with a horizontal guide bar 27 (see FIG. 6) of vertically curving configuration and located at a position to insure that when the plastic sheet 12 is trained therearound, its approach section will contact the upper roller at a lower portion of its downwardly sweeping periphery. This relationship enables initial application of the sheet portions to occur entirely under the control of the rollers and in fact, enables the upper roller to establish desired smoothing of the plastic sheet immediately in advance of its application.

Normally, the plastic sheet 12 and its backing sheet 17 are slightly larger or wider than the paper stock 18 and the edge regions of the plastic sheet 12 are resealed to the edge regions of the backing sheet 17. A simple edge trimming operation may then be performed to free the laminate from its backing sheet.

To produce the laminated transparency such as is shown in FIGS. 1 and 2, a printed sheet 18 preferably of clay enameled paper stock is first processed through the laminating apparatus disclosed herein to adhere the adhesively coated contact face of the front plastic sheet 12 thereon in full surfaced uniformly bonded contact. The composite laminate thus formed, is immersed in a solvent (water is usually sufficient), for several minutes to condition the clay surface of the paper stock for separation from the front sheet 12. As the paper stock is peeled off, the ink deposit originally defining the image on the paper stock adheres to the contact face to transfer the image to the plastic sheet 12 with full definition of its original clarity and with unbroken composition. The adhesively coated contact face of the rear sheet 13 is then applied to the contact face of the front sheet 12 by running the material through the lamination apparatus. For example, sheet 13 and its backing may replace sheet 12 and backing 17, and sheet 12 may replace sheet 18 as seen in FIG. 6.

Thus, a transparency, e.g., as illustrated in FIGS. 1 and 2, suitable for projection in conventional audio-visual projection equipment can be provided. The illustrated structure, in its preferred form, includes the transparent front plastic sheet 12 and the transparent rear plastic sheet 13 intimately adhered throughout their overlying portions by a transparent film 14 of adhesive disposed therebetween. These plastic sheets are of the type disclosed herein for application by the cold process laminating technique of this invention, and in the product of FIGS. 1 and 2, an image, designated generally at 15, is formed by ink deposits acquired on the contact face of the front sheet 12 by transfer from any inked sheet such as a magazine page, a newspaper page, or the like.

To achieve a clear, uniformly bonded laminated product, rollers 22 of the illustrated machine are resiliently distortable rollers and are spring-loaded against each other to provide opposing matched, flat contact faces defining a flat contact plane at the roll contact region. The machine has an entry shelf 24 and a similar receiving shelf 25 located on opposite sides of the roll contact region and providing sheet material support decks substantially coplanar with the contact plane defined by the rollers.

In the preferred arrangement for handling thin paper stock, the lower roller 22 is mounted as an idler while the upper roller 22 is connected to a direct drive motor 26 to operate as a drive roller. During the transfer of ink to adhesive layer 14 from clay-coated paper 18, the motor driven upper roller engages the plastic layer 12 which thus bears the principal stresses applied, and since the plastic layer better withstands this than does the thin paper stock of clay-coated paper 18, higher pressures and speed of operation are made possible. During lamination of the second plastic sheet to the plastic sheet carrying the ink, either sheet may be fed into direct contact with the upper roller.

A number of factors are now known to effect the uniformity and crystal clarity of bonding such as, the pressure acting between the rollers, the size and hardness of the rollers, and the roller speed. While the permissible speed may be increased by intensifying the pressure, a maximum pressure is determined by the strength of the sheet material that is to receive the laminate and more importantly by the tendency of the same to elongate locally or unevenly, thereby leading to wrinkling at higher pressures. For example, high pressures frequently result in buckling, seaming, and folding of thin paper stock or other readily pliable mediums, particularly where the high pressure is applied through an unduly wide contact face, the added width of which exerts a pronounced stretching action on the sheet material.

To appreciate the relationships involved, it is important to note that there must be great enough pressure and continuity of contact during the first lamination step for picking up the ink deposit to insure activating the adhesive to flow and penetrate the fibres or pores of the paper stock, and to insure that air entrapped in these pores or fibres is forced out and ultimately completely expelled from the region between the sheets being laminated. The degree of hardness of the resilient body of roller material is also an important factor in achieving and maintaining the relationships between pressure, speed, and contact face configuration. Where roller material, e.g., wood or steel, is too hard, sufficient contact face area for expulsion of entrapped air cannot be developed within acceptable pressure ranges, resulting in a generally foggy appearance in the laminated product. Where roller material is too soft, e.g., extremely soft rubber, excessive face area develops at workable pressure values and exerts excessive stretching action on the sheet material, resulting in tearing or buckling or the like.

The various criterion known to exist with respect to speed, pressure and roller size and hardness, can be represented by a time factor with respect to the transit time through the contact faces and a stretch factor with respect to the ratio of contact face width to roller diameter. The time factor should be great enough to allow for complete air expulsion and the stretch factor must be low enough to prevent stretching and wrinkling of the layers during the cold lamination procedure.

In the illustrated machine, rollers 22 are mounted to extend in parallel adjacent relation between a pair of tracks 31 and 32 and each roller is equipped with an axle 33 at each end that projects through a slot 34 and into a length-wise guideway 35 of the corresponding track. Each of the rollers 22 is preferably provided with a cylindrical contact surface having a resiliently deformable characteristic provided by a resilient material such as natural or synthetic rubber. This construction permits limited deformation of the contact surfaces when the rollers 22 are pressed together. In the form illustrated, the contact surfaces are formed by synthetic rubber sheeting having a durometer in the range 45/65.

As indicated in FIG. 5, the rollers 22 are disposed horizontally and are arranged in vertically offset superposed relation in the machine 21, and the axles 33 of the lower roller 22 are journalled in plain bearing blocks 36 that are received within the track guideways 35 and that are supported by compression springs 37 which seat against a closure wall 38 of a lower retainer 39.

Each of the bearing blocks 36 is formed to provide a substantially semi-circular recess in which an axle may rotate and each block is shaped to match the configuration of the track guideways 35, with a loose enough fit being employed so that the blocks 36 are freely movable along the tracks.

At the top of the device, plain bearing blocks 42 are interposed between the axles 33 of the upper roller 22 and the closure wall 38 of an upper retainer 43 to bear directly against the closure wall 38 of the upper retainer 43 as indicated in FIG. 5. Each of the blocks 42 is formed with a semi-circular recess that is complementary to and receives the corresponding axle 33 of the top roller 22. Each of the blocks 42 is shaped to match the configuration of the track guideways 35 with a sufficiently loose fit being employed so that the blocks 42 are freely movable along the tracks.

The blocks 42 in the illustrated embodiment are chamfered as at 44 to accommodate upper bolts 45. Conventional pillow block bearings may be employed in place of the bearings illustrated herein.

The rollers 22 terminate in frustoconical surfaces 46, and a thrust washer 47 is received over each axle 33 for location between the adjacent track and the frustoconical surface 46, as shown in FIG. 5.

In the illustrated embodiment of the invention, the top roller 22 is driven by a suitable electric motor 26, as is more fully described in our said copending application Ser. No. 280,062.

The roller system is supported by a base plate fixed to the lower retainer 39, and the whole is mounted in any suitable manner within protective housing or cover 23 (see FIG. 4). Housing 23 is preferably formed with the identical feedways or shelves 24 and 25 on each side thereof, that are vertically aligned with the contacting portions of the surfaces of rollers 22 to define entry and receiving shelves that are coplanar.

In the illustrated machine, the several components are proportioned and arranged so that the resilient bodies of the rollers 22 have opposing faces thereon contacting and correspondingly deformed to present substantially flat contact faces of matched size and configuration. As best seen in FIG. 6, the entry and receiving shelves 24 and 25 are aligned and located to support sheet material for movement in the plane of these faces and insure against curling of the laminated product as it enters and leaves the machine.

One important feature of the above described apparatus is that the rollers 22 are matched for providing substantially identical opposing contact face regions when loaded by the action of the compression springs 45. Each roller 22 consists of a central shaft enveloped by an annular body of resilient material arranged uniformly about the shaft and intimately fixed thereon. It is preferred to utilize rollers having a diameter of 2" or 2¼", and which have a resilient body having a radial thickness dimension of ⅜" comprised of 55/65 durometer Buna S rubber with minimum microwave surface. This specific disclosure is given to illustrate the general characteristics required for the rollers for achieving the required contact face area at proper pressure levels. Some variation from these figures is contemplated, as will become more clear, but in general rollers having these characteristics are required for successful cold process lamination machines.

There are a number of combinations of roller diameter and roller surface hardness characteristic for achieving a desired contact face width for a given value of contact face pressure;

(A) For a selected contact face width and pressure, it is possible to select a soft surfaced roller of small diameter and a hard surfaced roller of large diameter that are equivalent; and (B) A given surface hardness condition may be achieved by utilizing a large diameter shaft covered by a thin layer of relatively soft rubber or by using a smaller diameter shaft covered by a thick layer of relatively hard rubber. With these general considerations in mind, the action of the opposed flat contact faces of the rollers in adhering the plastic cover sheet to the paper worksheet may be examined.

If one considers the normal circular configuration of an unstressed roller and observes a pair of lines directed axially on the roller surface, it will be recognized that as the roller surface comes under stress, it undergoes successively greater distortion and in effect extends or expands. This expansive action at the contact face of a rubber body under stress is an inherent characteristic of pressure loaded rollers and in a laminating operation results in a corresponding stretching of the material being fed by the roller. Surface distortion of the roller may be designated by a stretch factor that depends upon the ratio of the contact face width to the roller diameter.

In general, the greater the stretch factor ratio, the greater the surface distortion of the roller, and hence the greater the stretching force for a given pressure. At any effective pressures, the stretching forces can exceed the strength of the paper and if the stretching of the paper is too great, wrinkling and buckling result.

Effective cold process laminating must allow adequate time for eliminating air and must therefore provide a gradual build-up of pressure over a contact face of limited width; limiting the width of the contact face, limits the surface distortion and stretching forces. The 2″ and 2¼″ diameter rollers, described previously herein, properly correlate the critical factors involved. They achieve a contact face width on the order of ¼ of an inch at an averaged pressure over the entire contact face of 20 p.s.i. and this enables operation at speeds of 90 surface inches per minute.

By experiment, it was found that a speed of as much as 128 surface inches per minute could be employed, but at this range, air entrapment becomes noticeable. This experiment gives a lower limit for the transit time through the contact face region. Thus, $$\text{Transit Time} = \frac{\frac{1}{4} \text{ inch}}{128 \text{ inch min.}} \times \frac{60 \text{ sec.}}{\text{min.}}$$

$$= \frac{15}{128} \text{ sec.} = \frac{1}{8} \text{ sec.}$$

In processing sheets through the illustrated machine as described above, the action of the opposed flat contact faces of the rollers in adhering the plastic sheet to the paper sheet, or the plastic sheet carrying the image to another plastic sheet, is important to the attainment of acceptable end products. As any given region of the laminate approaches the contact faces and moves progressively therethrough, the roller pressure acting to adhere the sheets increases gradually from the point of initial contact up to a maximum at the central region of the contact faces and thereafter pressure falls off gradually. An assumed pressure plot is shown at P in FIG. 6.

It has been determined that the pressure acting between the rollers determines the time required for achieving uniform activation of the adhesive and for achieving substantially complete expulsion of air. Where the pressure is increased, it becomes possible to operate at increased speeds and, correspondingly, lower pressures can be accommodated by operation at lower speeds. It should be noted that where the pressure value is to be changed, without however, changing the roller, the resultant contact face area increases. In general, with 2″ rollers of the type described herein, a pressure change from 20 p.s.i. to 33 p.s.i. develops a contact face width range of from ¼″ to %32″, with %16″ considered maximum, with the preferred roller arrangement, the stretch factor does not become appreciable.

A maximum limit of a stretch ratio factor is defined by:

$$\text{Stretch Ratio} = \frac{2\frac{1}{4}}{\frac{7}{16}} = \frac{7}{36}$$

or approximately ⅕ while a preferred range during the first lamination step is about ⅑ to ⅛ and during the second lamination step is about ⅛ to ⅐, giving a general over-all preferred range of ⅑ to ⅐.

The maximum pressure that may be used during the ink transfer is limited by virtue of the fact that the paper stock breaks down when subjected to high compression. Danger of breakdown of the paper stock is however, to a large extent avoided by the progressive increase of the pressure as applied by the flat contact faces. Where extremely narrow width contact faces are employed, the pressure build-up is so rapid that breakdown of the sheet material can occur at lower values of pressure.

In the method for providing transparencies on the laminating apparatus shown herein, it is preferred, during the second lamination step, to use a roller of 2 inches or 2¼ inches in diameter and 55/65 durometer hardness loaded to an average pressure distribution across its contact face of about 33 p.s.i. and driven at a surface speed of 40 to 45 surface inches per minute. At these values, crystal clarity of ink deposition is achieved and the water immersion period may be on the order of 5 to 10 minutes. It is possible to operate the same apparatus at a pressure value of 20 p.s.i. and 80 to 90 surface inches per minute but the interval must then increase to one hour or more and the clarity of definition and completeness of composition of the transferred ink image may be reduced somewhat.

In the second cold lamination step where the second plastic sheet is being laminated to the first sheet with the ink deposit adhesively carried therebetween, the latter conditions of 20 p.s.i. and 80 to 90 surface inches per minute may advantageously be used, although, where no adjustability of the pressure and speed is provided, the higher pressure and slower time are more than adequate.

We claim:

1. A method of making a transparency suitable for use in transparency projection systems from a pre-formed image which contains colored ink which is destroyed or changes color at hot laminating temperature, and for eliminating entrapped air and fogginess in the transparency product, which method comprises providing first and second transparent sheets, each sheet having a transparent cold bonding tacky pressure-sensitive adhesive coating covering one surface thereof, applying an image comprising said ink to the adhesive coating of the first sheet, applying the second sheet to the assembled image and first sheet with the adhesive coating of the second sheet facing and contacting the image and adhesive coating of the first sheet while cold pressing said first and second sheets together to intimately and homogeneously adhere said coatings to each other and to intimately adhere the coating of the second sheet to the exposed surface of the image in the absence of entrapped air while maintaining the first and second sheets flat and in the absence of surface bulging from ink deposits and in the absence of trapped air bubbles, and recovering the resulting transparency product, said adhesive coatings being of sufficient thickness and deformability to imbed and surround the image and isolate the image from direct contact with said transparent sheets.

2. The method of claim 1 wherein said pressing step is by delivering the sheets through the nip of a pair of opposing resilient rollers.

3. The method of claim 2 wherein said pressing step is by applying a pressure in the range of 20 to 33 p.s.i. to the nonadhesive coated surfaces of said sheets for a period of time of at least ⅛ second.

4. The method of claim 1 wherein the step of applying said image comprises pressing an image-bearing surface of a fibrous backing sheet having a release coating between the fibrous material and the image, and bearing said image, and on which the image has been printed, against the adhesive coating of said first sheet, and completely removing the fibrous backing from the image.

5. The method of claim 4 wherein said release coating is clay and said removing step comprises dissolving the clay coating in water.

6. The method of producing a transparency for use in light transmission projection comprising providing first and second transparent plastic sheets, each with a transparent pressure-sensitive adhesive coated contact face, said adhesive having sufficient ductility and modulus of elasticity to permit cold flowing of the adhesive under pressure for penetrating into valleys and pores in a paper surface, pressing the contact face of one of said sheets against an image face of a sheet of clay-coated paper stock having a heat-sensitive ink deposit thereon defining an image, forming a laminar assembly of said first plastic sheet and said paper sheet by feeding the laminar assembly at a rate of about 40 to 90 surface inches per minute between a rotating pair of superposed rollers having substantially identical resilient deformed flat contact faces providing a transit time of at least ⅛ of a second with said rollers acting on the laminar assembly at a pressure on the order of 20 to 33 p.s.i. to press the adhesive into valleys and pores of the paper and eliminate air deposits between said adhesive and said ink, each of said rollers having a ratio of contact face width to roller diameter in the range of about ⅑ to about ⅕, recovering the laminate from the rollers, removing the paper stock from the plastic sheet to leave on the adhesively coated contact face the image-defining ink deposit from the paper stock bringing together in facing relation the contact faces of said first and second plastic sheets to combine them, and cold pressing the sheets together by feeding the combined sheets between said rotating pair of rollers to remove all air bubbles and recover the resulting transparency from said rollers with said two adhesive coatings forming a homogeneous adhesive layer between said sheets imbedding and supporting said ink deposit from the sheet inner surfaces and with said sheet outer surfaces in flat condition and in the absence of bulging due to the imbedded ink deposits.

References Cited

UNITED STATES PATENTS

| | | | |
|---|---|---|---|
| 1,736,597 | 11/1929 | Higginson | 161—1 XR |
| 1,818,459 | 8/1931 | Bryan | 161—5 XR |
| 1,947,516 | 2/1934 | Broadman | 161—6 |
| 1,649,756 | 11/1927 | Thornton | 161—5 X |
| 2,046,924 | 7/1936 | Pendergast | 117—12 X |
| 1,968,095 | 7/1934 | Poschel | 156—241 X |
| 2,079,641 | 5/1937 | Walsh et al. | 161—413 X |
| 2,115,409 | 4/1938 | Casto | 161—6 |
| 2,362,980 | 11/1944 | Ball | 161—6 |
| 3,083,132 | 3/1963 | Miehle | 156—234 |
| 3,143,454 | 8/1964 | Hannon | 156—499 |
| 3,157,547 | 11/1964 | Newman | 156—234 |

ROBERT F. BURNETT, *Primary Examiner.*

W. A. POWELL, *Assistant Examiner.*

U.S. Cl. X.R.

156—241, 277, 300, 555; 161—5, 6, 406, 413